June 3, 1969     F. R. SCHNEIDER     3,447,513

ROTARY INTERNAL COMBUSTION ENGINE

Filed April 14, 1967

INVENTOR.
FRANKLIN R. SCHNEIDER

BY Graybeal, Cole & Barnard

ATTORNEYS

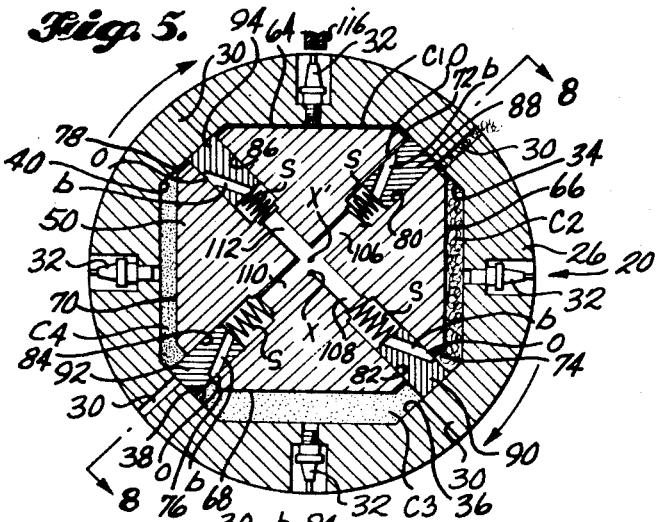
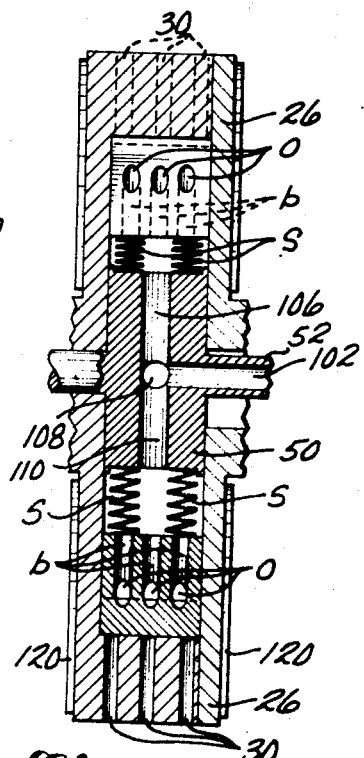
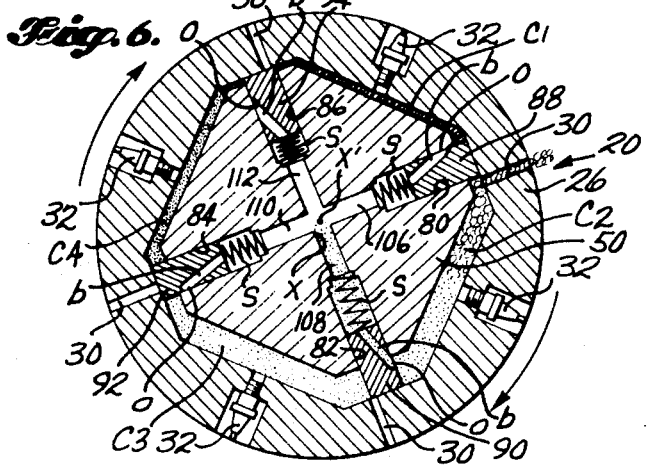
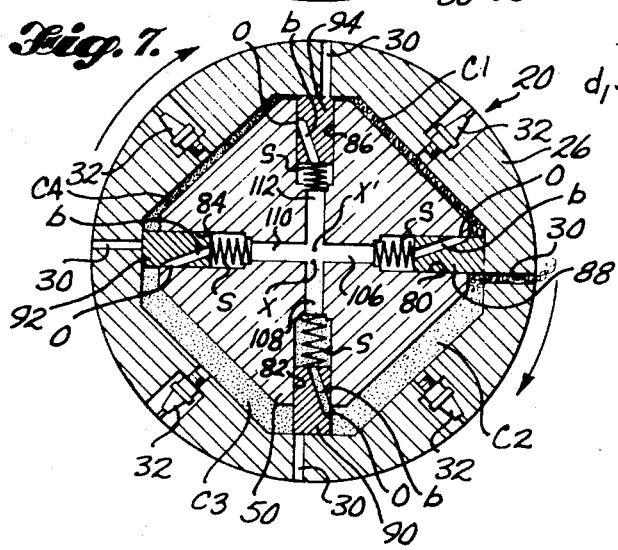
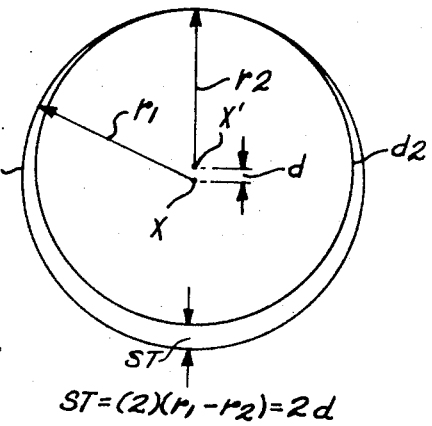
$ST = (2)(r_1 - r_2) = 2d$
INVENTOR.
FRANKLIN R. SCHNEIDER United States Patent Office 3,447,513
Patented June 3, 1969

3,447,513
ROTARY INTERNAL COMBUSTION ENGINE
Franklin R. Schneider, 6546 15th Ave. NW.,
Seattle, Wash. 98107
Filed Apr. 14, 1967, Ser. No. 630,851
Int. Cl. F02b 57/02
U.S. Cl. 123—16                      10 Claims

ABSTRACT OF THE DISCLOSURE

A rotary two cycle internal combustion engine comprising plural variable volume combustion chambers defined by and between inner and outer rotors, and by reciprocating radial abutments, with said rotors each revolving about their true centers but about separate, offset axes. Carbureted fuel-air delivery means leading first axially into the inner rotor, then radially outwardly to abutment pockets, and then through diagonal bores in the abutments, with the abutments and contiguous side wall portions of the abutment pockets defining slide type inlet valves and with the abutments make sliding contact at their outer ends with flat surface portions of the rotor cavity, and serving as seals and slide valve closure means for generally radial outlets. Gear train means coupling the two rotors together for synchronous rotation in the same direction and at the same angular velocity.

BACKGROUND OF THE INVENTION

Field of the invention

The present invention relates to the field of rotary internal combustion engines, and more particularly to engines of this type comprising a plurality of circumferentially spaced vairable volume combustion chambers formed by and between inner and outer rotors rotating about separate axes, and by radially moving abutments carried by the inner rotor and sliding back and forth at their outer ends along the inner periphery of the outer rotor, with the stroke of the engine being provided by the offset nature of the axes of rotation.

Description of the prior art

Wankel et al. 2,988,065 is illustrative of prior art rotary internal combustion engines having an inner rotor inside of an outer rotor with both arranged to rotate in the same direction, but about separate axes, and with variable volume combustion chambers being formed between the two rotors. In the engine disclosed by this patent, which is a four cycle engine, lobes carried by the inner rotor, and corner seals therefor, separate the working space into plural chambers, only one of which is a combustion chamber. The inlet port for the combustion chamber is formed in a side wall of the engine and is opened and closed by movement of the end wall of the inner rotor, and the outlet is formed in the pheripheral wall of the outer rotor.

Bailey 2,089,593; Bailey 2,127,968; Charlson 2,989,951 and Stefancin 3,034,484 each disclose variable volume chambers formed by and between iner and outer rotors, but in such devices as compressors, steam engines, hydraulic motors, etc. in which no combustion is involved, i.e. they do not relate to internal combustion engines.

SUMMARY OF THE INVENTION

The present invention relates to a rotary two cycle internal combustion engine of a new and unique type characterized by simplicity of construction, rendering it economical to manufacture.

Rotary internal combustion engines according to this invention are characterized by an outer rotor mounted for rotation about a first axis which is at the center of the rotor, and by a smaller inner rotor mounted inside a central cavity in said outer rotor for rotation about a second axis, which is at its center, and which is offset from said first axis. The outermost point on the inner rotor travels a circular orbit that is substantially tangent to a circular orbit traveled by an outermost point of the rotor cavity in the outer rotor. The inner and outer rotors rotate synchronously in the same direction and at the same angular velocity. A plurality of circumferentially spaced, generally radial outlet ports extend outwardly from the rotor cavity through a peripheral portion of the outer rotor. The inner rotor includes a plurality of circumferentially spaced raidal pockets, equal in number to and approximately in angular spacing with the outlet ports. A radial abutment is supported in each of the radial pockets, for radial-in-and-out movement with its outer end in sliding engagement with a continuous portion of the peripheral wall of the rotor cavity. The outer end portion of each abutment is larger than the related outlet so that it can function to cover and close the outlet during certain periods.

Side wall means constituting a part of the outer rotor cooperate with the abutments and with the peripheral surfaces of the rotor cavity and the inner rotor to form variable volume chambers between the inner and outer rotors in the radial direction and between adjacent pairs of abutments in the circumferential direction. Due to the offset nature of the two axes of rotation, the volume of each chamber changes from a minimum volume to a maximum volume and then back to a minimum volume again during each complete rotation of the rotors, starting from an ignition station.

According to the invention, the means for delivering fuel into each chamber comprises a central axial passageway entering the inner rotor from one end thereof, radial ports leading outwardly from said passageway to the abutment pockets, and diagonal ports leading from the inner ends of the abutments through the abutments to ports on the trailing sides of the abutments. Following the expansion phase of each combustion chamber the outlets of the fuel delivery bore in the abutment leading such chamber are exposed beyond the outer periphery of the inner rotor, and hence are open to permit inflow of a fuel charge into the chamber. During the compression, ignition and early expansion phases the outlets of the fuel delivery bores in the abutments are retracted into the abutment pockets and are effectively closed by contiguous side wall portions of such pockets.

Rotary internal combustion engines of this invention have no reciprocating parts connected to a crank shaft, no eccentric loading is involved as the rotors both rotate about their true centers, and no orbital action of a drive member is involved. As a result, intertial loading found in conventional internal combustion engines is not involved in engines of the present invention.

The rotary internal combustion engine of the present invention effectively combines the smooth operational characteristics of the gas turbine engines (i.e. owing to rotor rotation about true centers) with the low r.p.m., power and acceleration factors of conventional piston-type internal combustion engines.

Rotary internal combustion engines of the present invention may include a chamber scavenge phase, and fresh fuel charges are delivered into the combustion chambers with an impetus akinned to the impetus given fuel charges by a supercharger.

These and other inherent objects, features, advantages and characteristics of the present invention will be apparent from the following description of a typical and therefore nonlimitive embodiment of the invention, as described below in conjunction with the accompanying illustrations.

Brief description of the drawing

In the drawing like element designations refer to like parts, and:

FIG. 5 is the first of three similar radial plane views, of the two rotors isolated from the rest of the engine and depicting sequence of operation, such figure showing a first chamber at minimum volume, containing a compressed charge, and in a position for ignition; a second chamber immediately leading the first and in a stage of expansion; a third chamber immediately leading the second, at maximum volume, and containing a new fuel charge; and a fourth chamber immediately leading the third chamber and in a stage of compression;

FIG. 6 is the second of the three similar radial plane views and it shows the two rotors rotated approximately twenty five degrees (25°) in the clockwise direction from their positions in FIG. 5;

FIG. 7 is the third of the sequence views and shows the two rotors rotated approximately fifty degrees (50°) in the clockwise direction from their positions in FIG. 5;

FIG. 8 is an axial sectional view taken through the two rotors substantially along lines 8—8 of FIG. 5, and showing the arrangement of the abutments and the biasing springs therefor in the abutment pockets; and FIG. 9 is a diagrammatic view of the orbits of the furthest points on the rotor cavity and inner rotor from their respective centers of rotation.

Detailed description of the invention

Figure 1:
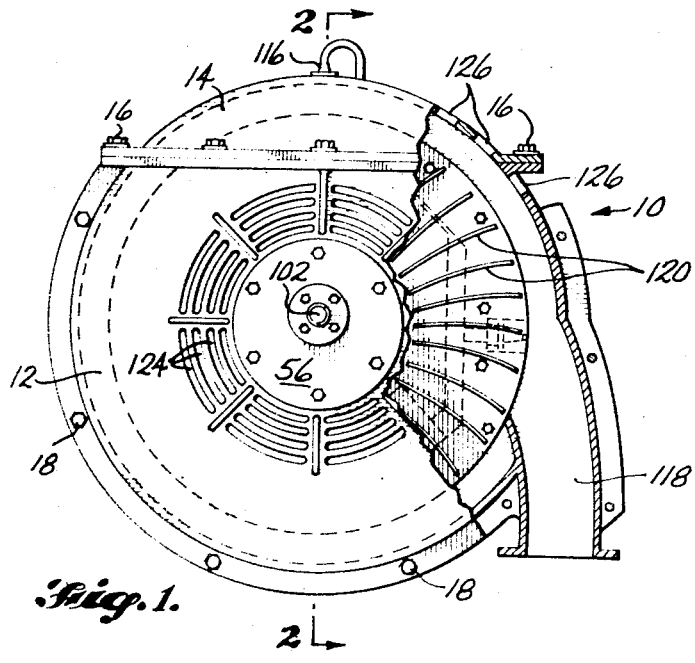
FIG. 1 is a side elevational view of a rotary internal combustion engine constructed according to the present invention, with a portion of the housing being cut away for clarity of illustration of certain parts located inside the housing.

Referring more specifically to the several figures of the drawings, the illustrated embodiment includes a stationary housing 10 comprising a lower section 12 and a removable upper section 14 detachably secured thereto, such as by means of a plurality of bolts, some of which are designated 16. The lower section 12 may be of split form, for easy assembly and disassembly, with the two side parts thereof detachably secured together, such as by means of a plurality of bolts, some of which are designated 18.

The power assembly is situated inside the casing 10 and its major components are an outer rotor 20 and an inner rotor 22.

The outer rotor 20 may comprise a major portion composed of a side wall 24 and an integral peripheral ring 26, and a minor part 28 securable in its radial outer extent to the peripheral ring 26. Minor part 28 constitutes the second side wall. The components 24, 26, 28 of the outer rotor 20 together define a generally central rotor cavity of octagonal outline (FIGS. 5–7).

The outer rotor 20 is provided with four outlets 30 which may extend radially outwardly from the rotor cavity as illustrated, or may be slanted rearwardly so that the exhausting gases will produce some impetus by reaction. The outlets 30 may comprise a plurality of parallel radial bores formed in the peripheral ring 26. The sets 30 of such ports are spaced approximately ninety degrees (90°) apart, and a spark type igniter 32 is located between each adjacent pair of outlet port sets 30. Four of the eight parts of the octagonal peripheral wall of the rotor cavity, designated 34, 36, 38, 40 in FIG. 5, are shorter than the remaining four walls.

The outer rotor 20 may be supported for rotation by a pair of coaxial annular flanges 42, 44 in lieu of a center shaft. Flange 42 is an integral part of the major part 24 and flange 44 is an integral part of the minor part 28. The flanges 42, 44 are suitably journeled by bearings 46, 48. The center of rotation X of the outer rotor 20 is at the center of the rotor cavity.

An inner rotor 50 is supported in the rotor cavity for rotation about a second axis X' which is offset from the axis of rotation X. In the illustrated embodiment inner rotor 50 is also of octagonal form and may include at one side a stub shaft 52 that is journeled by a bearing 54 carried by a removable end cap 56. Rotor 50 is preferably supported at its opposite side by the output shaft 58 which is journeled in bearings 60 carried by a removable ring 62.

Inner rotor 50 is shown to have four major peripheral surface parts 64, 66, 68, 70 which are substantially as long as the major peripheral wall parts of the rotor cavity. Rotor 50 also includes four minor surface parts 72, 74, 76, 78 which are shorter in length than the minor wall parts 34, 36, 38, 40. The inner rotor 50 is formed to include four generally equally spaced, radially extending, abutment pockets 80, 82, 84, 86 which extend across the full width of the inner rotor 50 and bottom at locations spaced radially outwardly a substantial distance from the center X'.

Four radially reciprocating abutments 88, 90, 92, 94 of rectangular proportions are sungly received in the abutment pockets 80, 82, 84, 86 and serve to divide the space defined between the inner and outer rotors 50, 20 into four variable volume combustion chambers C1, C2, C3, C4.

During synchronous rotation of the two rotors 20, 50, i.e. rotation at the same angular velocity and in the same direction, the inner rotor 50 in essence oscillates back and forth in the rotor cavity of the outer rotor 20. Although rotor 50 turns in a purely circular orbit it undergoes a reciprocal stroke-like action relative to rotor 20 because 20 travels a different orbit. The length of the stroke is twice the distance of offset, i.e. the distance between, the two axes X, X'. When the rotors are in the position of FIG. 5 the portion of rotor 50 between the upper pair of abutments is rather snuggly received in the nook of the rotor cavity formed by the uppermost three parts of the peripheral wall of said cavity. The stroke length is diagrammatically illustrated by FIG. 9, wherein ST is the stroke and it equals twice the radius difference (R1–R2), and the radius difference $d$ is the offset of the axis.

Figure 2:
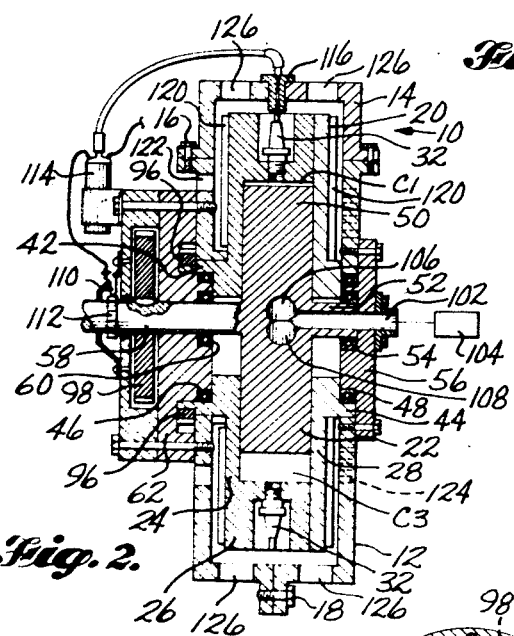
FIG. 2 is an axial sectional view taken substantially along line 2—2 of FIG. 1, and showing a preferred manner of rotatively mounting the rotars, and showing one of the spark igniters carried by the outer rotor in position for energization by means on the housing.
Figure 3:
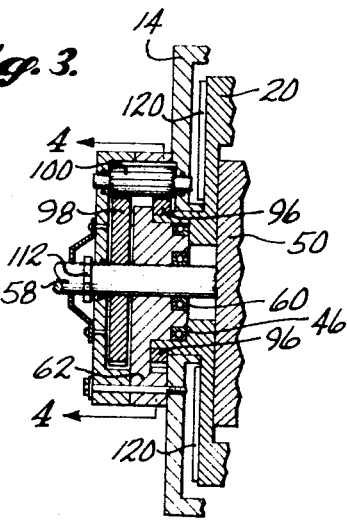
FIG. 3 is a fragmentary axial sectional view taken at a generally horizontal plane that is substantially perpendicular to the sectional plane 2—2, such view showing the gear train which connects the two rotors together for synchronous rotation.
Figure 4:
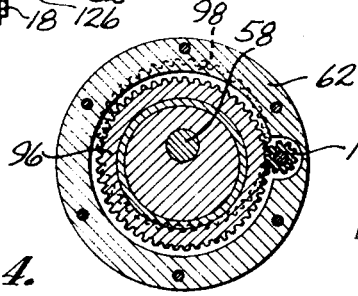
FIG. 4 is a radial sectional view taken substantially along lines 4—4 of FIG. 3, and showing the idler gear positioned at one of the two locations where the gear teeth of the two radial gears become axially aligned.

A preferred form of gear train means for coupling the two rotors 20, 50 together for synchronous rotation is shown by FIGS. 2–4. Such gear train comprises a pair of identical (in terms of diameter and size and number of teeth) gears 96, 98 situated in separate, laterally spaced radial planes which are parallel to each other and to the general plane of rotation of the two rotors. Gear 96 forms or is secured to the terminal portion of flange 42 and is centered at the axis of rotation X for the outer rotor 20. Gear 98 may be keyed (as illustrated) or otherwise secured to the output shaft 58, and is centered X'. The teeth of the two gears 96, 98 come into axial alignment at locations laterally offset from the plane that includes the two axes of rotation X, X'. An idler gear 100 is located at one of these locations. It meshes with the teeth of both gears 96, 98 and couples them together for synchronous rotation.

Referring to FIGS. 2 and 5–8, the stub shaft 52 may be provided with an axial bore 102 in fluid receiving communication with passageway means leading from a conventional carburetor 104 or the like. Radial bores 106, 108, 110, 112 may extend the passageway 102 into the abutment cavities 80, 82, 84, 86. Each abutment 88, 90, 92, 94 includes one or more bores *b* extending generally diagonally from the inner end of the abutment outwardly and rearwardly (with respect to the direction of rotation) to a side located outlet opening *o*. The openings *o* are spaced inwardly from the outer ends of the abutments 88, 90, 92, 94 such a distance that they are uncovered and opened at the proper time in the intake phase. This occurs when a chamber is near or at maximum volume. During other periods of rotation the abutment is retracted into its pocket and the outlet opening(s) *o* is blocked and closed by a contiguous portion of the pocket wall.

As will be evident, the displacement, compression ratio and horsepower can be varied by altering the sizes of rotors A and B and also by varying the distance between the axes X, X'.

The abutments 88, 90, 92, 94 may be biased outwardly by means of compression springs S which serve the purpose of urging the outer end surfaces of the abutments 88, 90, 92, 94 into sealing engagement with the peripheral wall part 34, 36, 38, 40 during periods of slow rotation, e.g. when starting. During periods of relatively fast rotation the abutments 88, 90, 92, 94 will be maintained in contact with the surfaces 34, 36, 38, 40 by centrifugal force.

Immediately following each expansion cycle, when a combustion chamber involved is approaching maximum volume, the outlet port 30 associated with such chamber is uncovered by the abutment which trails the chamber in the direction of rotation. During other periods the end of such abutment covers and closes such outlet port.

Abutments 88, 90, 92, 94 slide back-and-forth along surfaces 34, 36, 38, 40 a distance equal to twice the distance of offset of the axes X, X'. For sake of example, if the offset distance were to be two inches (2″) the distance of sideways abutment movement would be four inches (4″). This makes it possible to locate the exhaust outlets 30 in the proper position in ring 26 to be opened and closed at the proper time. It also makes it possible to locate the outlets 30 at locations which provide an overlap period between the periphery of the inlet and the outlet so as to create a scavenge phase.

It can be seen from the foregoing discussion that abutments 88, 90, 92, 94 serve five distinct functions. Firstly, they serve as vane dividers or partitions for dividing the working space between the two rotors 20, 50 into four separate chambers C1, C2, C3, C4. Secondly, they provide inlets for the fuel charge. Thirdly, they provide inlet valves. Fourthly, they serve as valves for regulating the opening and closing of the outlet ports 30 leading from the combustion chambers C1, C2, C3, C4. Fifthly, their ends provide seals.

In the illustrated ignition system (FIG. 2) breaker points 110 are actuated by cam lobes 112 located on output shaft 58. The breaker points 110 are preferably adjustable to permit variations in ignition timing. Breaker points 110, in conjunction with ignition coil 114, provide a high voltage at station 116, at each time an igniter 32 is at station 116 in position to ignite the compressed fuel charge in the combustion chamber to which it is related. This type of arrangement eliminates the need for a separate ignition distributor for each igniter 32.

*Operation*

During operation both rotors 20, 50 turn in the same direction and at the same angular velocity. In FIGS. 5–7 they are shown to be turning clockwise.

In FIG. 5, combustion chamber C1 is in a firing position. It is at or substantially at minimum volume, it contains a compressed fuel charge, and its spark igniter 32 is in position to be energized by means 116. It is closed at its sides by the side walls 24, 28 and at its ends by the abutments 88, 94. Upon ignition the compressed gases in chamber C1 begin to expand and increase the volume of chamber C1, causing rotation of the rotors 20, 50 in the clockwise direction. FIG. 6 shows chamber C1 rotated approximately twenty-five degrees (25°) from its position in FIG. 5, and in a stage of expansion. FIG. 7 shows chamber C1 rotated approximately fifty degrees (50°) in the clockwise direction from its position in FIG. 5, and still undergoing expansion. Expansion continues until chamber C1 is approximately in the position of chamber C2 in FIG. 6. At that time outlet 30 for chamber C1 is at least partially uncovered, by movement of the trailing abutment 94, permitting the gases to exhaust from the chamber C1. At the same time the inlet opening *o* in the leading abutment 88 is exposed beyond the end of peripheral surface 72, permitting an inflow of a fresh fuel charge from the spider manifold 106, 108, 110, 112, which receives such charge from passageway 102 and carburetor 104. Since the fuel charge is influenced by centrifugal force while in passageway 106 it enters chamber C1 with some impetus and forceably scavenges the chamber C1.

When chamber C1 reaches the position of chamber C3 in FIG. 5 it is again closed at both ends by the abutments 88, 94, and it contains a fresh fuel charge. Such fuel charge is at least slightly compressed due to the centrifugal force. Thus, the chamber is in effect "supercharged."

As the rotors 20, 50 continue to rotate the chamber C1 is returned to its firing position at the top of FIG. 5. During this phase of rotation both ends of the chamber C1 remain closed by the abutments 88, 94; the chamber C1 undergoes a volume change from maximum to minimum, and the fuel charge contained therein is compressed.

Herein the term "fuel charge" is used to identify the fluid delivered through passageway 102, bores 106, 108, 110 and 112 and bores *b*, into the chamber C1, C2, C3, C4. In the illustrated embodiment such fluid is a carbureted mixture of a hydrocarbon fuel and air, originating from carburetor 104.

The casing 110 is provided with an outlet passageway 118 positioned substantially where exhausting occurs. Outlet passageway 118 may be somewhat tangentially directed, as illustrated.

Preferably the outer rotor 20 is provided with cooling vanes 120 at each of its sides, and cooling air openings 122, 124 are provided in the sides of the casing 10, to permit ingress of cooling air into the interior of the casing 10. The periphery of the casing 10 may comprise a series of openings 126, also provided for cooling purposes.

The invention is not to be limited to the exact arrangement of parts shown in the accompanying drawing or described in the specification, as various changes in the details of construction may be resorted to without departing from the spirit of the invention. Therefore, the invention is to be limited only insofar as it is particularly pointed out in the accompanying claims.

What is claimed is:

1. A rotary internal combustion engine comprising: an outer rotor mounted for rotation about a first axis, and formed to include a generally central rotor cavity and a plurality of circumferentially spaced, generally radial, outlet ports extending outwardly from said rotor cavity; an inner rotor, smaller than said rotor cavity and mounted inside said rotor cavity for synchronous rotation with said outer rotor, in the same direction but about a second axis offset from said first axis, said inner rotor including a plurality of circumferentially spaced radial pockets, equal in number to and approximately equal in angular spacing with said outlet ports; a radial abutment supported in each of said radial pockets for radial in-and-out movement with its outer end in sliding engagement with a portion of the peripheral wall of said rotor cavity, said outer end portion being larger than the related outlet port so that it can cover and close said port; side wall means cooperating with said abutments and the peripheral surfaces of said rotor cavity and said inner rotor to form variable volume chambers between adjacent pairs of abutments, with the volume of each chamber changing from a minimum volume to a maximum volume and then back to a minimum volume again during each complete revolution of the rotors; means for delivering fuel into each chamber when its volume is relatively large; and means for igniting said fuel when the chamber volume is substantially at minimum, with each chamber being in exhausting communication with a related one of said outlet ports during a period of the time following combustion and expansion, and with the trailing abutment for each chamber closing the exhaust port for such chamber at other periods.

2. A rotary internal combustion engine according to claim 1, wherein said means for delivering fuel into each chamber comprises a delivery passageway leading into the central portion of the inner rotor, radial ports in said inner rotor leading outwardly from said passageway, and ports in each of said abutments extending generally diagonally from the inner ends of such abutments to side located outlets, each of said outlets being spaced inwardly from the outer end of the related abutment; so that it is exposed beyond the periphery of the inner rotor only during periods of substantially large volume, and is blocked off and effectively closed by a contiguous surface portion of the abutment pocket during the remaining periods at which times the abutment is at least partially into its pocket.

3. A rotary internal combustion engine according to claim 1, wherein the rotor cavity and the inner rotor have generally octagonal peripheral outlines, and there are four abutments, each of which slides relatively back and forth along only one side of the octagonal periphery of said rotor cavity during rotation of the rotors.

4. A rotary internal combustion engine according to claim 1, wherein said means for delivering fuel into each chamber comprises a delivery passageway leading into the central portion of the inner rotor, radial ports in said inner rotor leading outwardly from said passageway, and ports in each of said abutments extending generally diagonally from the inner ends of such abutments to side located outlets, each of said outlets being spaced inwardly from the outer end of the related abutment; so that it is exposed beyond the periphery of the inner rotor only during periods of substantially large volume, and is blocked off and effectively closed by a contiguous surface portion of the abutment pocket during the remaining periods at which times the abutment is at least partially into its pocket, and wherein the rotor cavity and the inner rotor have generally octagonal peripheral outlines, and there are four abutments, each of which slides relatively back and forth along only one side of the octagonal periphery of said rotor cavity during rotation of the rotors.

5. A rotary internal combustion engine according to claim 1, further comprising a pair of substantially identical gears situated in laterally spaced radial planes, means connecting one of said gears to the inner rotor so that it rotates therewith about the axis of the inner rotor, means connecting the second gear to the outer rotor so that it rotates therewith about the axis of the outer rotor, with the teeth of such gears being generally axially aligned at a location laterally from the plane that includes the two axes of rotation, and an idler gear in mesh with both of said first and second gears at such location of axial alignment of the gear teeth.

6. A rotary internal combustion engine according to claim 1, wherein said ignition means comprises a spark igniter carried by the outer rotor, said igniter extending generally radially and having an inner electrode end in communication with the related combustion chamber and an outer terminal projecting outwardly beyond the outer periphery of the outer rotor, and electrical energy supply means positioned to make contact with the outer terminal of each igniter when its combustion chamber is substantially at minimum volume and contains a compressed fuel charge.

7. A rotary internal combustion engine according to claim 1, wherein each of said rotors undergoes a substantially balanced rotation about a substantially true center.

8. A rotary internal combusion engine according to claim 2, wherein each of said rotors undergoes a substantially balanced rotation about a substantially true center.

9. A rotary internal combustion engine according to claim 2, wherein the outer ends of the ports in the abutments are located on the trailing sides of the abutments, and the trailing abutment for each combustion chamber is the closure for the outlet ports for such chamber.

10. A rotary internal combustion engine according to claim 9, wherein the outlet ports in the outer rotor and the outlets of the fuel delivery bores in the abutments are so positioned that during one period of operation both are open and a fresh fuel charge is able to flow into the chamber to scavenge the exhaust gases therefrom.

References Cited

UNITED STATES PATENTS

| | | | |
|---|---|---|---|
| 3,244,155 | 4/1966 | Laudet | 123—8 |
| 3,304,879 | 2/1967 | Hanson | 103—121 |
| 3,306,531 | 2/1967 | Oppermann | 123—8 X |
| 3,318,291 | 2/1967 | Hallenbeck et al. | 123—8 |

MEYER PERLIN, *Primary Examiner.*

WILLIAM E. WAYNER, *Assistant Examiner.*

U.S. Cl. X.R.

91—70; 230—140